US007216029B2

(12) United States Patent
Blankenhorn et al.

(10) Patent No.: US 7,216,029 B2
(45) Date of Patent: May 8, 2007

(54) METHOD AND DEVICE FOR CONTROLLING AN INTERNAL COMBUSTION ENGINE

(75) Inventors: Ulrich Blankenhorn, Grossbottwar (DE); Stefan Polach, Stuttgart (DE); Oliver Brox, Stuttgart-Weilimdorf (DE); Joerg Maas, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/192,380

(22) Filed: Jul. 27, 2005

(65) Prior Publication Data

US 2006/0047404 A1 Mar. 2, 2006

(30) Foreign Application Priority Data

Aug. 26, 2004 (DE) ..................... 10 2004 041 217

(51) Int. Cl.
*G06F 19/00* (2006.01)
*F02B 17/00* (2006.01)

(52) U.S. Cl. ....................... 701/103; 123/295; 123/305

(58) Field of Classification Search ................ 123/295, 123/305, 430, 431; 60/277, 285, 286; 701/101–105, 701/112, 113

See application file for complete search history.

(56) References Cited

U.S. PATENT DOCUMENTS

| | | | | |
|---|---|---|---|---|
| 5,050,550 | A * | 9/1991 | Gao | 123/431 |
| 5,636,614 | A * | 6/1997 | Morikawa | 123/435 |
| 5,870,992 | A * | 2/1999 | Kamura et al. | 123/305 |
| 6,244,243 | B1 * | 6/2001 | Mamiya et al. | 123/295 |
| 6,584,952 | B1 * | 7/2003 | Lagier | 123/295 |
| 6,655,346 | B2 * | 12/2003 | Esteghlal et al. | 123/295 |
| 6,725,826 | B2 * | 4/2004 | Esteghlal | 123/295 |
| 2003/0182934 | A1 * | 10/2003 | Adler et al. | 60/286 |
| 2005/0016163 | A1 * | 1/2005 | Kitahara | 60/285 |

* cited by examiner

*Primary Examiner*—Willis R. Wolfe, Jr.
(74) *Attorney, Agent, or Firm*—Kenyon & Kenyon LLP

(57) ABSTRACT

A method and a device for controlling an internal combustion engine. The air quantity supplied to the internal combustion engine is controllable by a first actuator, and/or the fuel quantity supplied to the internal combustion engine is controllable by a second actuator in at least two operating modes. The operating mode is processed as a function of its assigned priority, this priority being predefinable.

5 Claims, 1 Drawing Sheet

METHOD AND DEVICE FOR CONTROLLING AN INTERNAL COMBUSTION ENGINE

BACKGROUND INFORMATION

Internal combustion engines having external ignition, especially internal combustion engines having direct injection, are operated in various operating modes. These operating modes differ for instance in the mixture formation and thus the application strategy and the software functions for the injection system, the air system and/or the ignition system. The application data for the functions that are specific to the operating mode are stored in different setpoint value characteristics map structures. The switch to a particular operating mode depends on the engine operating point, the ambient conditions and/or the instantaneous state of the drive train and/or the vehicle. To coordinate the switch in operating modes in externally ignited internal combustion engines, the operating mode having the most optimal fuel consumption is selected as a function of the aforementioned variables.

Modern internal combustion engines having direct injection, especially diesel engines, use exhaust-gas aftertreatment systems. Furthermore, it may be provided to introduce novel combustion methods to lower the emissions. Different application strategies and software functions specific to the operating mode, which are coordinated and switched as a function of the engine operating point, the ambient conditions and/or the instantaneous state of the drive train and the vehicle, are utilized in this context.

In externally ignited internal combustion engines the switchover and the selection of the operating mode are essentially selected as a function of consumption, i.e., the operating mode providing the lowest consumption will be chosen. This approach cannot be transferred to an internal combustion engine having direct fuel injection since different requirements regarding the selection of the operating mode exist there. In this case, the operating modes are selected on the basis of the requirements of individual subsystems. For instance, it may be provided that the internal combustion engine be equipped with a particle filter. A regeneration of this particle filter will be required in the presence of certain operating states, so that a switchover to the regeneration of the particle filter operating mode must then be made. Compared to an operating mode having low fuel consumption, this operating mode has a clearly higher priority under certain circumstances.

According to the present invention, in a device and a method for controlling a combustion engine, the air quantity supplied to the internal combustion engine is able to be controlled by a first actuator, and/or the fuel quantity supplied to the internal combustion engine is able to be controlled by a second actuator in at least two operating modes, the operating mode being processed as a function of its assigned priority and this priority being predefinable.

Due to the fact that the operating mode is processed as a function of its priority, the priority being predefined, it is possible to prioritize the requests of the subsystems in a variable manner and to process them at a variable priority. In an especially advantageous development, it is provided that the operating-mode coordinator not only process the request of the operating mode of the subsystem, but in addition also priority information that is predefined by the subsystem in an especially advantageous exemplary embodiment. The processing sequence of the requests is not stipulated, but is variable on the basis of the additional priority information. Before processing of the requests takes place within the operating-mode coordinator, the requests are sorted according to their priority.

It is especially advantageous that the operating mode and/or the priority of the operating mode are/is predefined as a function of an engine operating point, ambient conditions and/or a state of an exhaust-gas aftertreatment system.

The operating modes are preferably requested by a subsystem. The corresponding subsystem also specifies the priority at which the request is to be processed.

DETAILED DESCRIPTION

Figure 1:
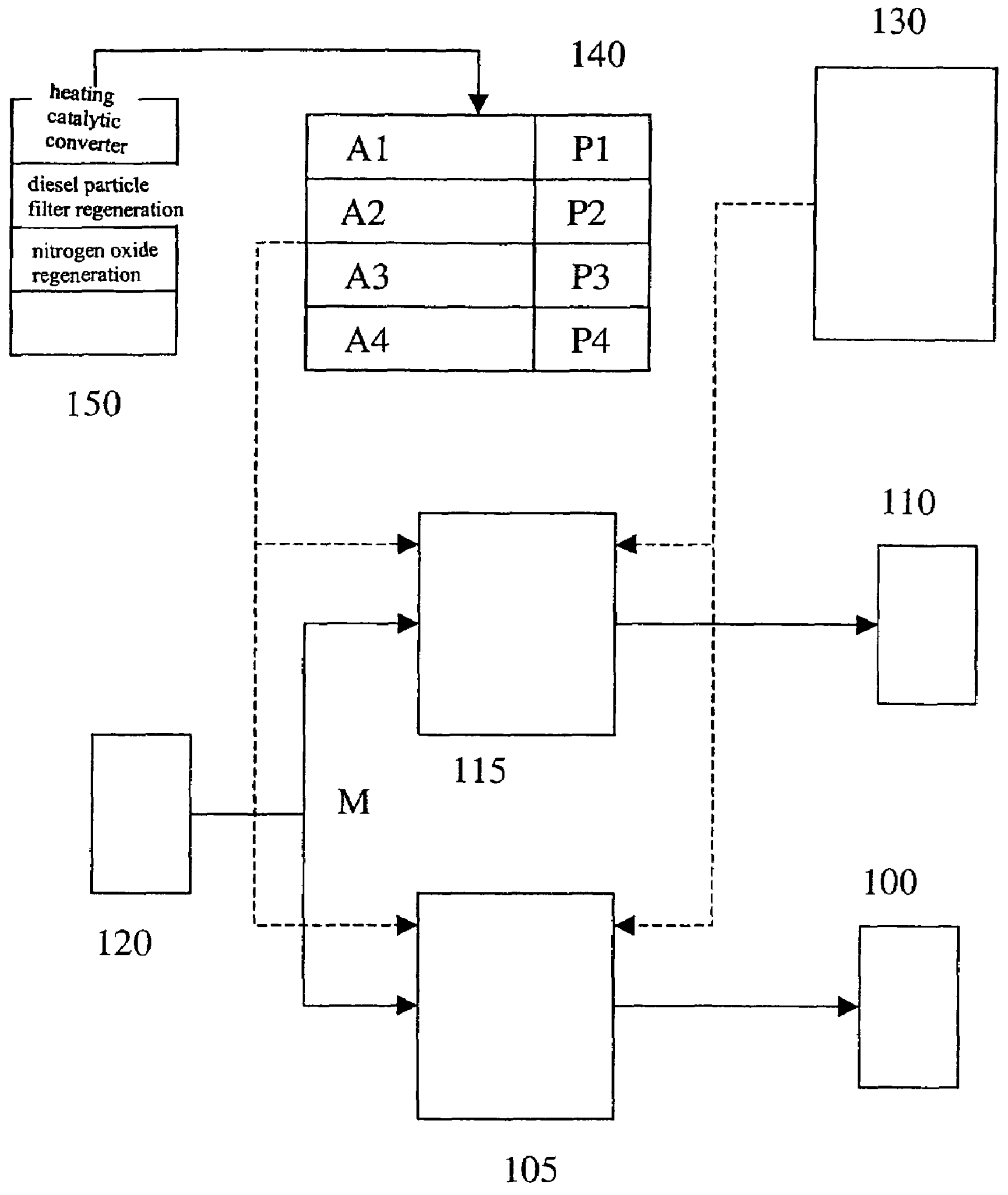
FIG. 1 shows a block diagram of the procedure according to the present invention.

FIG. 1 shows the components that are required for an understanding of the present invention.

A fuel actuator is denoted by 100 in FIG. 1, and an air actuator is denoted by 110. The air actuator is controlled by an air system 115, and fuel actuator 100 is controlled by an injection system 105. A torque setpoint selection 120 applies a signal M both to air system 115 and injection system 105, the signal characterizing the driver-desired torque of the internal combustion engine. This signal M is preferably a torque variable that is predefined on the basis of the driver input, which is detected with the aid of a drive-pedal position sensor, for instance.

Furthermore, air system 115 and injection system 105 receive additional input signals from various supplementary functions 130. Such supplementary functions are, for instance, a regulation of a lambda value, a regulation of an exhaust-gas temperature, a regulation of an ignition-firing point and/or a regulation of a combustion center point. By controlling the injected fuel quantity and/or the air quantity, the regulation of the lambda value regulates a variable characterizing the oxygen concentration in the exhaust-gas line to a setpoint value. The regulation of the exhaust gas temperature via control of at least one operating parameter characterizing the exhaust-gas temperature, in particular the injected fuel quantity and/or the beginning of the injection of the main injection, and/or a post-injection, regulates to a setpoint value. To regulate the ignition-firing point and/or the combustion center point, a variable characterizing the combustion process is detected by a sensor. To this end, particularly sensors ascertaining a variable that characterizes the combustion-chamber pressure and/or the structure-borne noise of the engine are utilized. On the basis of these sensor signals, features are ascertained that characterize the combustion process. These features are adjusted by influencing the injected fuel quantity, the beginning of fuel metering and/or the air quantity.

Furthermore, an operating-mode coordinator 140 applies signals to air system 115 and/or injection system 105. Different subsystems 150 act upon the operating-mode coordinator with requests A1 through A4 and assigned priorities P1 through P4.

On the basis of desired torque M, which is predefined by torque setpoint selection 120 as a function of the driver wish and possibly additional variables, air system 115 determines an air quantity to be supplied to the internal combustion engine. On the basis of this desired air quantity, air system 115 then determines a control signal to apply to air actuator 110. Air actuator 110 preferably is an actuator for influencing the exhaust-gas recirculation rate, in particular an exhaust-recirculation valve and/or a throttle valve to throttle the fresh air quantity supplied to the internal combustion engine. In an analogous manner, injection system 105 determines the fuel quantity to be injected on the basis of desired torque M, and determines a control signal for fuel actuator 100 therefrom. Fuel actuator 100 is preferably a solenoid valve or a piezoactuator which determines the fuel quantity supplied to the internal combustion engine. In particular, injection system 105 predefines the control duration and the control instant.

Such an internal combustion engine may be operated in different operating modes. A first operating mode is preferably normal operation during which the internal combustion engine is operated in such a way that the exhaust emissions and fuel consumption are in an optimal range. In a second operating mode, the regeneration of a particle filter may be provided, for instance, it being possible here to select different operating modes in different phases of the regeneration, if appropriate. For example, it may be provided that an increase in the exhaust temperature is to be achieved in a first operating mode of exhaust-gas regeneration, and uncombusted hydrocarbons are to be introduced into the exhaust gas in a second operating mode. In another operating mode it may be provided that a catalytic converter, in particular a nitrogen oxide catalytic converter be regenerated. In addition, it may be provided that a catalytic converter be heated up in one operating mode.

The operating modes differ in that different dependencies of the output variables from the input variables are selected, the output variables are ascertained as a function of different input variables, and/or different output variables are ascertained. In this context it is possible to intervene only in the air system or the injection system in different ways. As an alternative, it is possible to intervene in the air system and the injection system in different ways.

For instance, it may be provided that a different number of partial injections be implemented in various operating modes. For example, a post-injection will take place in different operating modes. In other operating modes no post-injection but only a main injection and possibly a pre-injection are carried out. This means that the duration of post-injection output variable will or will not be determined in different operating modes.

The operating modes may also differ in that different characteristics maps are utilized both in air system 115 and in injection system 105. That is to say, the dependency of the output variables from the input variables differs in the various operating modes.

Furthermore, it may be provided that different input variables are used to form the output variables in different operating modes. In particular the air quantity is specified to be different. In the injection system, the injection quantity of the individual partial injections and possibly the injection start of the individual partial injections is specified to be different.

These measures may be combined as desired. For example, two operating modes may differ in the number of partial injections, the dependency of the quantity of the main injection from at least one input variable, and in the input variables for calculating the quantity of the post-injection.

According to the present invention it was realized that the various requests have different priorities, i.e., in normal operation, normal operation has the highest priority so that the emissions of exhaust gas, and the noise as well as the fuel consumption are kept as low as possible. If a regeneration of the exhaust-gas aftertreatment system is required, for instance the nitrogen oxide catalyst must be regenerated or the particle filter is to be regenerated, this operating mode may possibly have a higher priority than normal operation. This means that the subsystem specifies to the operating-mode coordinator the operating mode, for instance particle-filter regeneration, and the corresponding priority P1. The operating-mode coordinator then forwards the corresponding operating mode to the air system and the injection system as a function of the priority.

This means, for instance that if the subsystem detects particle filter regeneration, i.e., a regeneration of the particle filter is necessary, it forwards request A1 with priority P1 to the operating-mode coordinator. Request A2, normal operation having priority P2, is already present there. The operating-mode coordinator then checks whether priority P1 is higher than priority P2. If this is the case, i.e., the regeneration of the particle filter is more important than normal operation, the operating-mode coordinator controls both the air system and the injection system in such a way that a regeneration of the particle filter takes place.

This means that the request and the priority at which the request is to be processed are stored in the operating-mode coordinator. This request and priority are predefined by a subsystem, for instance the subsystem of particle filter regeneration or nitrogen oxide catalyst regeneration, these subsystems predefining both the priority and the request. The subsystems predefine the request and also the priority as a function of an engine operating point, ambient conditions and/or a state of the exhaust-gas aftertreatment system. One and/or a plurality of these variables may be used for this purpose. The engine operating point is defined particularly by the torque and the rotational speed of the internal combustion engine and/or additional variables such as temperature and pressure values. The state of the aftertreatment system is defined particularly by the loading of the particle filter with particles or the loading of the nitrogen oxide catalyst by nitrogen oxide, and/or additional variables such as temperature and pressure values.

The requests are then processed by the air system and the injection system as a function of the priority.

What is claimed is:

1. A device for controlling an internal combustion engine, comprising:

at least one of (a) a first actuator for determining an air quantity supplied to the internal combustion engine and (b) a second actuator for determining a fuel quantity supplied to the internal combustion engine, the at least one of the first actuator and the second actuator being controllable in at least two operating modes; and means for processing an operating mode as a function of a predefined assigned priority;

wherein the priority is specified by a subsystem, and wherein the operating mode is requested by the subsystem.

2. A method for controlling an internal combustion engine, comprising:

controlling at least one of (a) an air quantity supplied to the internal combustion engine by a first actuator and (b) a fuel quantity supplied to the internal combustion engine by a second actuator, in at least two operating modes; and processing an operating mode as a function of a predefined assigned priority;

wherein the priority is specified by a subsystem, and wherein the operating mode is requested by the subsystem.

3. The method according to claim 2, wherein the priority is predefined as a function of at least one of an engine operating point, ambient conditions and a state of an exhaust-gas aftertreatment system.

4. The method according to claim 2, wherein the operating mode is requested as a function of at least one of an engine operating point, ambient conditions and a state of an exhaust-gas aftertreatment system.

5. The method according to claim 2, wherein the operating modes differ in that different dependencies of output variables from input variables are selected, the output variables are ascertained as a function of different input variables, and different output variables are ascertained.

* * * * *